United States Patent Office 2,932,625
Patented Apr. 12, 1960

2,932,625

MANUFACTURE OF POLYESTERS

William Robert Burton and Norman Standring, Blackley, England, assignors to Imperial Chemical Industries Limited, London, England, a corporation of Great Britain No Drawing. Application February 9, 1956
Serial No. 564,364

Claims priority, application Great Britain June 29, 1955

3 Claims. (Cl. 260—75)

This invention relates to the manufacture of polyesters particularly the fibre-forming polyesters known as the highly polymeric polymethylene terephthalates.

It thas been proposed in British patent specification No. 578,079 to make highly polymeric polymethylene terephthalates by a process comprising reacting a glycol of the series $HO(CH_2)_nOH$ with terephthalic acid or a low aliphatic ester of terephthalic acid and heating the reaction product to obtain esters in a highly polymerised condition. In the practice of the process of this specification it has been found that the use of ratios of glycol to dialkyl esters of terephthalic acid of less than 2:1 while giving short reaction times on the very small scale in the laboratory is not suitable for commercial operation, because when larger batches of material are used the reaction time increases to such an extent as to be uneconomic. Thus, it has become standard practice to use a glycol to dialkyl ester molecular ratio of greater than 2:1 to obtain economic reaction times. In British patent specification No. 578,079 all the examples take place at temperatures of 200° C. or thereabouts. This is because the presence of the initial large quantities of glycol in the reaction mixture ensures that some free glycol is present throughout the reaction, and prevents temperatures of 200° C. being exceeded. Furthermore, it has been generally accepted that in a reaction mixture containing any free glycol, heating above 200° C. is undesirable because of the tendency for discolouration of the product.

According to the present invention we provide a process for making highly polymeric polymethylene terephthalates, wherein a glycol of the series $HO(CH_2)_nOH$, where $n$ is an integer from 2 to 10, is reacted in an ester-interchange reaction with a di-alkyl ester of terephthalic acid and the product heated until polycondensation takes place and a highly polymeric polymethylene terephthalate is obtained, characterised in that during the ester-interchange reaction the temperature exceeds 210° C. but does not exceed 300° C. and that the glycol to dialkyl terephthalate molecular ratio is less than 2:1. Preferably the ratio is in the range 1.5:1 to 1.3:1.

If temperatures of 300° C. are exceeded in the ester-interchange reaction we have found that the colour of the highly polymeric polymethylene terephthalate obtained is not good enough for use as fibre or film-forming materials and that it has a low softening point, as a result of degradation. To ensure that a good quality polyester is obtained we prefer that the temperature should not exceed 280° C.

In a particular form of our invention, ethylene glycol is reacted with dimethyl terephthalate to form polyethylene terephthalate. This is the best known highly polymeric polymethylene terephthalate and has great merit as a film and fibre-forming material.

To increase the speed of reaction, catalysts may be used for the ester-interchange reaction and the polycondensation. For the former lead oxide, zinc acetate or calcium acetate are suitable, while for the latter lead oxide and antimony oxide are known to give good results.

The following example, in which all parts are by weight, illustrates but does not limit the scope of our invention.

EXAMPLE

The experimental results are listed in the table. The specified quantities of ethylene glycol and dimethyl terephthalate are heated in a reaction vessel fitted with a reflux condenser using as catalyst 0.015% of zinc acetate and 0.02% of antimony oxide. Ester-interchange takes place at atmospheric pressure and is complete when 512 gm. of methanol has been collected. The reaction mass is then transferred to an autoclave fitted with a constant speed agitator. The temperature is brought to 275° C. and the pressure reduced to less than 1 mm. of mercury. Polycondensation proceeds with elimination of glycol until the required molecular weight is attained. The course of the polycondensation is followed by measuring the increase in power input required by the constant speed agitator. In all cases the reaction is stopped when a limit is attained known to correspond with an intrinsic viscosity of 0.6–0.7.

*Table*

| Weight Ethylene Glycol, Parts | Weight Dimethyl Terephthalate, Parts | Molar Ratio | Ester Interchange | | | Polycondensation | | | Total Time | | Intrinsic Viscosity | Softening Point, °C. |
|---|---|---|---|---|---|---|---|---|---|---|---|---|
| | | | Time | | Temperature Range, °C. | Temp., °C. | Time at 1 mm. | Time in autoclave | | | | |
| | | | Hrs. | Mins. | | | | | Hrs. | Mins. | | |
| 1,240 | 1,552 | 2.5:1 | 4 | 35 | 147–208 | 275 | 1.16 | 2 50 | 7 | 25 | .61 | 260.6 |
| 645 | 1,552 | 1.3:1 | 3 | 54 | 151–276 | 275 | 1.22 | 1 27 | 5 | 21 | .64 | 259.5 |
| 1,240 | 1,552 | 2.5:1 | 5 | 07 | 158–210 | 275 | 1.40 | 2 55 | 8 | 02 | .65 | 260.2 |
| 694 | 1,552 | 1.4:1 | 4 | 20 | 150–264 | 275 | 1.15 | 1 20 | 5 | 40 | .62 | 262.2 |
| 670 | 1,552 | 1.35:1 | 3 | 30 | 150–277 | 275 | 1.16 | 1 27 | 4 | 57 | .66 | 258.1 |
| 670 | 1,552 | 1.35:1 | 3 | 55 | 150–277 | 275 | 1.45 | 1 54 | 5 | 49 | .61 | 258.6 |
| 645 | 1,552 | 1.3:1 | 4 | 00 | 150–291 | 275 | 2.26 | 2 31 | 6 | 31 | .63 | 256.0 |
| 670 | 1,552 | 1.35:1 | 4 | 00 | 151–282 | 275 | 1.01 | 1 15 | 5 | 15 | .62 | 258.0 |

From the results in the table it can be seen that using molar ratios of less than 2:1 glycol to dimethyl terephthalate, the total reaction time is lower than when high ratios are used and the product obtained is in no way inferior, as shown by intrinsic viscosity and softening point measurements. Using these low glycol ratios greatly reduces the amount of glycol distilling off during the polycondensation step, which, in any commercial process, must all be reclaimed and purified for use again. Furthermore, the reduction in glycol content of the reaction mass enables a greater amount of dimethyl terephthalate to be present in the reactor and thus increases the production rate.

In the example, it will be seen that the reaction takes place in two reaction vessels. Previously, when temperatures for the ester-interchange have not exceeded 200° C. it has been necessary, on transferring the products of ester-interchange to the polycondensation autoclave, to raise the temperature of the mass to 275° C., thus wasting production time in the autoclave. Using the process of our invention, the products of the ester-interchange can be transferred at much higher temperatures with the minimum waste of production time in the autoclave.

Furthermore, when the change-over from ester-interchange to polycondensation takes place it is necessary to reduce the pressure to 1 mm. of mercury. Using an initial glycol/dimethyl terephthalate ratio greater than 2:1 in commercial production, as in the prior art, this reduction in pressure must be a slow process as any effort to reduce pressure quickly with glycol present, causes excessive frothing of the reaction mass and tends to cause blockages in the vacuum lines to the reaction vessel. This in turn tends to prolong the polycondensation time. When the lower glycol/dimethyl terephthalate ratios of our invention are used there is far less glycol present at the end of the ester-interchange reaction. This reduces the tendency to frothing and enables the pressure to be reduced more quickly with no fear of blockages occurring and leads to a considerable saving in time.

The saving in polycondensation time obtained using the process of our invention can be clearly seen from columns 7 and 8 of the table. Using the lower glycol ratios the difference between the time the reaction mass is held at a pressure of 1 mm. and the total time in the autoclave is very small. With the higher ratios this difference is much greater.

The saving in total production time is shown in column 9.

What we claim is:

1. A process for making highly polymeric polymethylene terephthalates by polycondensation of the ester-interchange reaction product which has been prepared by reacting ethylene glycol under atmospheric pressure with a di-lower alkyl ester of terephthalic acid at an ester-interchange temperature rising in excess of about 210° C. but less than about 300° C. with the molar ratio of said glycol to said di-lower alkyl terephthalate ester between 1.3:1 and 2:1, thereafter reducing the pressure to less than about 1 mm. of mercury without reducing the temperature, and conducting said polycondensation step at a temperature of about 275° C. until an intrinsic viscosity of from about 0.6 to 0.7 is attained.

2. A process according to claim 1, wherein said ratio is in the range 1.5:1 to 1.3:1.

3. A process according to claim 1, wherein said ester-interchange temperature does not exceed 280° C.

References Cited in the file of this patent

UNITED STATES PATENTS

| | | |
|---|---|---|
| 2,465,319 | Whinfield et al. | Mar. 22, 1949 |
| 2,643,989 | Auspos et al. | June 30, 1953 |

OTHER REFERENCES

Hardy: J.S.C.I., 67, 426–32, November 1948.